INVENTORS
JUNG WOO WOO
PAUL F. WATERS
RAYMOND H. HOROWITZ
ALBERT F. HADERMANN

BY Ernest J. Cohen
M. Howard Silverstein
ATTORNEYS

United States Patent Office 3,662,046
Patented May 9, 1972

---

3,662,046
METHOD OF MAKING REVERSE OSMOSIS MEMBRANES FOR DESALINATION OF WATER
Jung Woo Woo, Arlington, Va., Paul F. Waters, Washington, D.C., and Raymond H. Horowitz, Silver Spring, and Albert F. Hadermann, Ijamsville, Md., assignors to the United States of America as represented by the Secretary of the Interior
Filed June 3, 1970, Ser. No. 43,049
Int. Cl. B29d 7/20
U.S. Cl. 264—41
14 Claims

ABSTRACT OF THE DISCLOSURE

Reverse osmosis membranes are produced by spraying a film-forming solution onto a substrate in a zone into which is injected, throughout spraying, an inert gas saturated with polymer solvent vapor. Solvent is then evaporated from the film by reducing the degree of solvent saturation of the inert gas in the evaporation zone by introducing gas that is less than saturated with solvent, by lowering the atmospheric pressure in the zone or by heating the atmosphere. The film is then cured in the prior art manner by quenching and annealing. Electrostatic spraying is most effective.

---

This invention relates to the production of reverse osmosis (RO) membranes.

Heretofore such membranes, often referred to as semipermeable porous membranes, have been formed by casting a film-forming solution onto a substrate such as glass, water or mercury followed by solvent evaporation, water quenching and annealing. Usually these films have been quite thick, especially during large-scale production. Furthermore, membranes produced in this manner have lacked homogeneity within individual membranes and have lacked uniformity between membranes made by the same procedure. This has detracted from the utility and reliability of the product.

We have now discovered that uniform and homogeneous RO membranes can be formed by spraying a film-forming solution onto a substrate in an atmosphere containing controlled amounts of polymer solvent vapor. Such control is attained by injecting into the spraying zone, throughout the spraying operation, an inert (non reactive) carrier gas containing polymer solvent vapor. Electrostatic deposition is a particularly effective mode of spraying the solution, and can produce ultra-thin RO membranes (as thin as 600 angstroms). With regard to the composition of the film-forming solution, those solutions heretofore employed to cast RO membranes are suitable. Typical solutions are disclosed by S. Loeb et al., Department of Engineering Report No. 60-60, University of California, Los Angles, 1960 (see also U.S. Patent No. 3,133,137), and by S. Manjikian, Industrial and Engineering Chemistry Product Research and Development, 623 (1967).

After deposition of the film to the desired thickness, some solvent is evaporated from its exposed face by raising the temperature or reducing the pressure or diluting the solvent vapor in the surrounding atmosphere through the addition of solvent-free inert gas to the system. In this manner "skinning" commences wherein a salt-impervious barrier ultimately forms on the film's face.

Subsequently, the membrane is cured (quenched and annealed) in the prior art manner. However, the membrane of the present invention, even without annealing, has a substantially high salt rejection (e.g., 60% for simulated sea water), and is therefore useful in many processes, in its intermediate form, as an RO membrane. This is in marked contrast to prior art cast membranes which generally have not exhibited any ability to reject salts from sea water and without first annealing the film.

It is therefore an object of the present invention to form an RO membrane by spraying a film-forming solution onto a substrate under controlled conditions especially with respect to the presence of polymer solvent vapor in the spraying environment.

Another object is to carry out such spraying electrostatically.

A further object is to evaporate solvent from the film, during commencement of skinning, under controlled conditions especially with respect to polymer solvent vapor.

A still further object is to produce an RO membrane without an annealing step.

Other objects and advantages will be obvious from the following more detailed description of the invention in which FIG. 1 is a schematic view of a system for practicing the invention in a batchwise manner;

Figure 1:
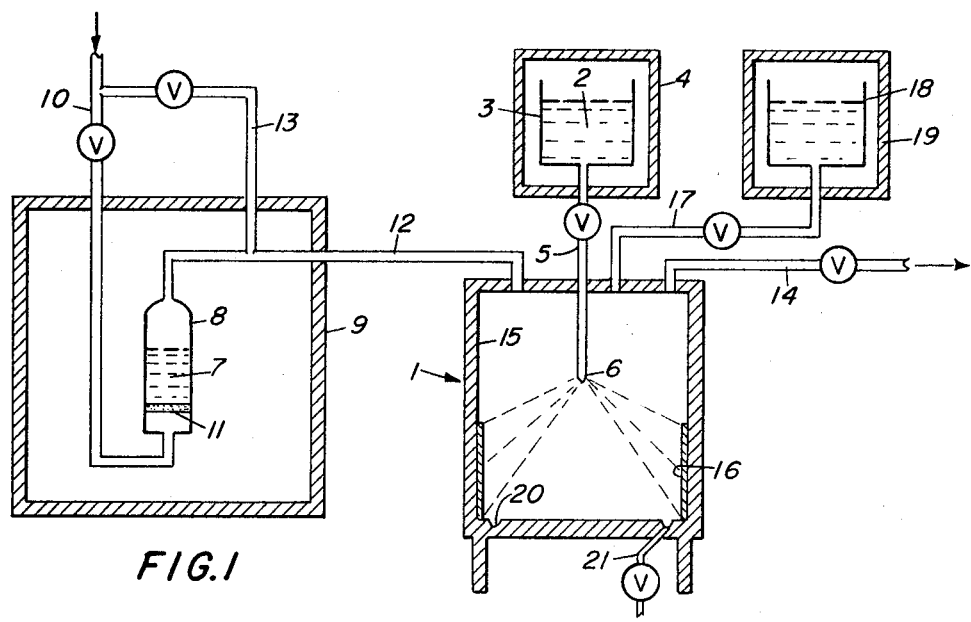

Referring first to FIG. 1, reference numeral 1 designates a cylindrically shaped, closed spraying chamber. Film-forming solution 2 is supplied to the spray chamber from an adjacent reservoir 3 housed in a closed chamber 4. A conduit 5 conveys solution to spray chamber 1 from reservoir 3, and the solution enters the spray chamber through spray nozzle 6 at the bottom of the conduit.

Most prior art spraying devices are suitable for aerosolization. For example, nozzle 6 can be of the rapidly rotating disc-type wherein solution is flung by centrifugal force to the periphery of the disc and outward as a fine spray. Likewise, other means such as a vibrating hollow reed can be employed as the nozzle, or hydraulic, or pneumatic means can be employed to force solution through a perforated nozzle.

Temperature control is effected over spray chamber 1 with an appropriate jacket or coil (not shown). Likewise, the temperature of chamber 4 is controlled in the same manner, if desired. A spraying temperature of about minus 20° C. to about 60° C. is suitable for most solutions heretofore employed to produce RO membranes.

During the operation, to maintain control of the atmospheric composition and pressure in spray chamber 1, and also to maintain additional control of the temperature therein, a body of solvent 7 is provided in solvent reservoir 8 housed in a temperature-controlled compartment 9. Solvent 7 is the same as the polymer solvent in film-forming composition 2. An inert (non-reactive) carrier gas such as nitrogen, injected into the system at conduit 10, is diffused through solvent 7 by glass frit 11, and then passes through conduit 12, as solvent vapor-containing carrier gas, to spray chamber 1. A by-pass conduit 13 is connected to conduit 10 to provide in spray chamber 1, when desired, solvent-free carrier gas or a mixture of solvent-saturated and solvent-free gas. Carrier gas exits from spray chamber 1 through conduit 14.

During the spraying step, the inert gas continuously carries solvent vapor into chamber 1, and gas is slowly and continuously withdrawn through exit conduit 14. As to the amount of vapor in the injected gas, it is present in a saturated or near-saturated amount (e.g., within 0.5% of saturation) relative to the temperature in the spraying zone.

Inner cylindrical wall 15 of spray chamber 1 on which membrane or film 16 forms during spraying is fabricated from materials heretofore employed to produce RO membranes by casting. For example, glass, metals such as stainless steel, plastics, or ceramics are suitable. Substrates not heretofore employed such as fabrics, felts, porous ceramics or porous polymers can also be employed.

After film 16 is deposited to a desired thickness, spraying is discontinued and conditions are adjusted to evaporate some solvent from the exposed face of the membrane. This can be accomplished by raising the temperature about 1°–5° C. within spray chamber 1. Alternatively, evaporation is attained by reducing the pressure in the chamber, or the atmospheric composition therein is adjusted to reduce the partial pressure of solvent vapor by the addition of solvent-free carrier gas via by-pass conduit 13.

Although the inert gas fed through conduit 12 to chamber 1 during the evaporation step may be solvent-free, the presence of some solvent vapor therein provides additional control over the rate of evaporation. Preferably, the vapor is present in an amount of about 5% to about 95% of saturation relative to the temperature in the evaporation zone. With regard to the usual polymer solvents (e.g., acetone, dioxane, or acetone/formamide), evaporation time ranges from 30 seconds to 10 minutes under the following exemplary conditions: Atmospheric pressure, evaporation temperatures of about 20° C. to 25° C., and the presence of solvent vapor in the carrier gas in an amount of about 0% to 99% of saturation.

Next, spray chamber 1 is flooded with quenching liquid such as water, dioxane/water or acetone/water. This is supplied through conduit 17 from adjacent liquid reservoir 18 housed in temperature-controlled chamber 19. A quenching temperature of about 0° C. to 15° C. is preferable. Quenching liquid is drained from spray chamber 1 through annular gutter 20 and exit conduit 21, after which the spraying chamber is disassembled, and the membrane removed and annealed, if desired, in the prior art manner.

Figure 2:
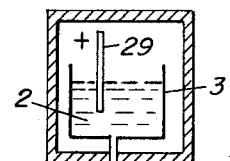
FIG. 2 is a fragmentary view of a modification of FIG. 1.
Figure 3:
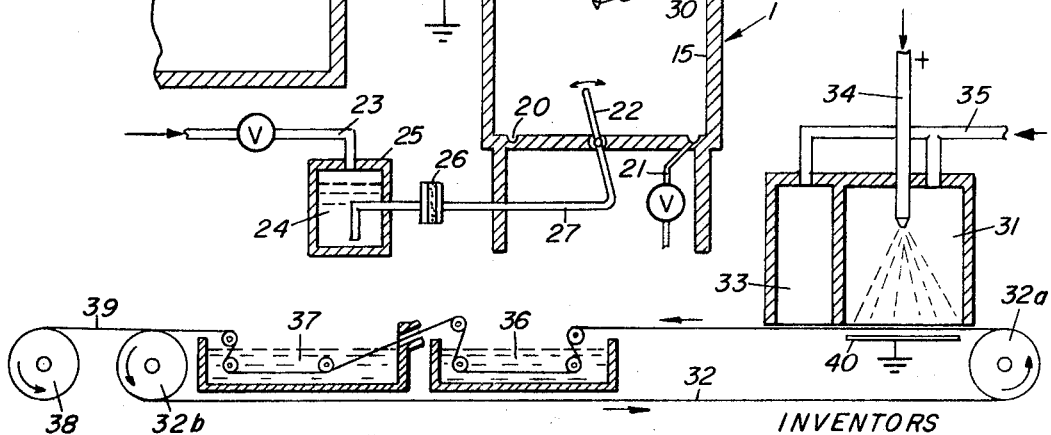
FIG. 3 is a schematic view of a system for practicing the invention in a continuous manner.

Referring now to FIG. 2, therein is shown a modification of the system of FIG. 1 which enables ultra-thin RO membranes (e.g., as thin as 600 angstroms) to be produced. First, it is necessary to carry out the spraying in a substantially dust-free environment. To accomplish this, the interior of chamber 1 is washed, prior to spraying, with a solvent such as acetone, sprayed through swivel nozzle 22 connected to the bottom of the chamber. Fluid pressure supplied through conduit 23 forces washing solvent 24 out of reservoir 25 through glass frit filter 26 and conduit 27 to the swivel nozzle. Dust-containing washing solvent flows down wall 15 and leaves the chamber by gutter 20 and conduit 21. Dry nitrogen supplied through by-pass conduit 13 and conduit 12 then removes any traces of the solvent.

A glass frit filter 28 disposed in conduit 12 insures against particulate matter passing to the spray chamber during any part of the operation. Further, film-forming solution is passed through a filter such as a medium porosity Pyrex glass filter prior to being filled into solution reservoir 3.

Spraying is carried out electrostatically in this modification, and the necessary potential is established by a positively charged electrode 29 immersed in solution reservoir 3 and grounded ring-shaped electrode 30 adjacent and touching conductive wall 15. A voltage range is preferably of the order of 10–50 kilovolts depending primarily on the electrical properties of the solution (i.e., dielectric constant and specific resistivity), and on its surface tension. For example, solutions of low specific resistivity may lose charge rapidly necessitating higher voltages.

The following example illustrates the forming of an RO membrane by electrostatic aerosolization.

A solution consisting of 26.8% (by weight) cellulose acetate, 58% acetone and 14.7% formamide was sprayed at 25 kilovolts and 24° C. onto a glass substrate in an atmosphere saturated with acetone over a period of 69 minutes to a final thickness of 0.0022 inch. The temperature was maintained at 24° C., and dry nitrogen at 0% saturation relative to acetone was added for 20 seconds to allow the film to evaporate. It was then quenched in water at 0° C. for a period of one hour. Thereafter the membrane was removed from the substrate and annealed at 85° C. for 5 minutes. Using a 0.5% (by weight) NaCl feed solution at 1000 p.s.i. flowing through a desalination cell at 250 ml./min., this membrane gave a salt rejection of 95.6%. The corresponding rate of production of desalinated water was 15 gallons per square foot per day. Using a 3.5% by weight NaCl feed solution at 1500 p.s.i. flowing through the desalination cell at 250 ml./min., the membrane gave a salt rejection of 93.5%. The corresponding rate of production was 8.3 gallons per square foot per day.

Referring now to FIG. 3, therein is shown a system for carrying out the invention in a continuous manner. Reference numeral 31 designates the spraying chamber disposed above a moving continuous belt 32 driven by rollers **32*a* and 32*b*. Adjacent the spraying chamber is evaporation chamber 33. Conduit 34 supplies film-forming solution to spray chamber 31, while solvent vapor is supplied, as desired, to chamber 31 or 33, through conduit 35**.

To maintain chambers 31 and 33 essentially as enclosed compartments, flaps can be provided at the chamber openings through which belt 32 passes. Further, a slight positive pressure can be maintained in each chamber to prevent ingress of impurities.

After the deposited film exists from evaporation (initial skinning) chamber 33, it passes through quenching bath 36, and then through annealing bath 37. A roller 38 picks up the finished membrane 39.

To employ electrostatic spraying in a continuous production system, a positive voltage is impressed upon the film-forming solution supplied to spraying chamber 31, grounded electrode 40 is positioned below belt 32 in spraying chamber 31.

Endless belt 32 is driven at a speed adjusted in accordance with the deposition rate and the film thickness desired. A residence in the spraying chamber of the magnitude of one-half hour will usually be sufficient when employing electrostatic spraying. As to the length of initial skinning or evaporation chamber 33, it depends on such factors as the composition of the film-forming polymer solvent, the evaporation temperature, solvent vapor partial pressure, etc. Exemplary evaporation times given previously for batch operations are also suitable for continuous production. Quenching tank 36 is preferably of sufficient linear (or folded) extension to permit at least a one hour quenching period. Finally, the annealing tank preferably is long enough to provide a film residence time of five to fifteen minutes.

Although not shown in FIG. 3, appropriate valves, supply reservoirs, carrier gas exit conduits and a carrier gas by-pass conduit for supplying solvent-free gas to the spraying and evaporation chambers are provided in the system.

In the practice of the present invention, whether in a batch or continuous manner, electrostatic spraying is particularly effective in that it can be employed to control direction, rate and molecular orientation of the deposited material. Membranes of usual or unusual geometery can be formed. Such control, in combination with the control of temperature, atmosphere composition, etc., enables precise definition and optimization of the finished membrane, and production of membranes that exhibit high salt rejection without annealing. Furthermore ultrathin films can be produced electrostatically, and such membranes exhibit properties indicative of unusually long RO membrane life.

What is claimed is:

1. In a process for forming a salt-rejecting reverse osmosis membrane wherein a film-forming solution comprising a polymer and polymer solvent is deposited as a film on a substrate, solvent is evaporated from said film, the film is then cured to form said salt-rejecting reverse osmosis membrane, and said membrane is stripped off said substrate to make a self-supporting film, the improvement comprising said depositing step comprising spraying said solution onto said substrate in a zone into which an inert gas is injected simultaneously with said spraying, said inert gas being substantially saturated with solvent vapor, said solvent vapor being the same composition as said polymer solvent; and wherein said evaporation step comprises reducing the degree of said solvent saturation above said film.

2. The process of claim 1 wherein said evaporation step comprises heating said film.

3. The process of claim 1 wherein said spraying is carried out electrostatically.

4. The process of claim 2 wherein said spraying is carried out electrostatically.

5. The process of claim 12 wherein said evaporation step is carried out in a zone wherein an inert gas is injected during said evaporation; wherein said inert gas contains said solvent vapor in less than a saturated amount.

6. The process of claim 3 wherein said curing step of claim 1 consists essentially of quenching said film.

7. The process of claim 3 wherein said deposition is carried out in a temperature-controlled zone, and wherein said solvent vapor is initially dispersed in said inert carrier gas in a temperature-controlled zone.

8. The process of claim 5 wherein said spraying is carried out electrostatically.

9. The process of claim 5 wherein said curing step of claim 1 consists essentially of quenching said film.

10. The process of claim 7 wherein said curing step consists essentially of quenching said film.

11. The process of claim 1 wherein said evaporation step comprises reducing the pressure adjacent said film.

12. The process of claim 1 wherein said evaporation step comprises reducing the amount of solvent vapor in the gas adjacent said film.

13. The process of claim 11 wherein said spraying in carried out electrostatically.

14. The process of claim 12 wherein said spraying is carried out electrostatically.

References Cited

UNITED STATES PATENTS

| 3,432,585 | 3/1969 | Watson et al. | 264—216 X |
| 3,127,456 | 3/1964 | Wahl | 264—24 |
| 3,439,074 | 4/1969 | Sharples et al. | 264—41 |
| 3,592,953 | 7/1971 | Ward et al. | 264—79 |

ALFRED L. LEAVITT, Primary Examiner

J. H. NEWSOME, Assistant Examiner

U.S. Cl. X.R.

110—93.4; 210—500; 264—79, 217, 299, 340